Dec. 5, 1939.   J. FISCHER   2,182,583
HAMMER TYPE BRAKE LEVER EXTENSION
Filed June 11, 1938
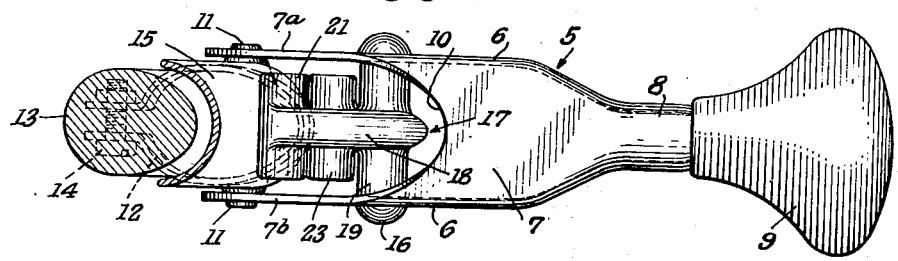
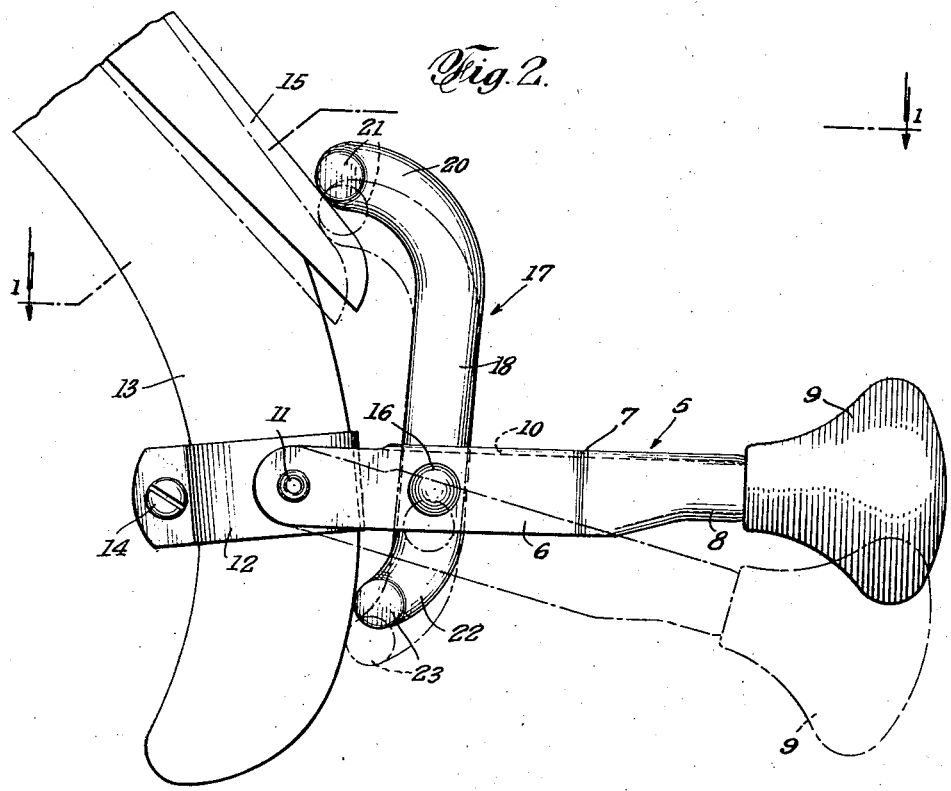
INVENTOR
JOSEPH FISCHER
BY
ATTORNEYS Patented Dec. 5, 1939

2,182,583

UNITED STATES PATENT OFFICE 2,182,583

HAMMER TYPE BRAKE LEVER EXTENSION

Joseph Fischer, New York, N. Y.

Application June 11, 1938, Serial No. 213,118

10 Claims. (Cl. 74—479)

My present invention relates to a brake lever extension and aims to devise a device of the general character indicated which is simple in construction, easy and economical to fabricate and assemble and admirably adapted to perform the intended functions.

The invention particularly resides in the provision of a new type of tripping member, the use of which makes for a sturdier construction than was heretofore available and one which is more positive in its operation.

In the accompanying specification, I shall describe and in the annexed drawing, show an illustrative embodiment of the device of the present invention. It is however to be clearly understood that I do not wish to be limited to the exact details herein shown and described for purposes of illustration only.

In the accompanying drawing, Fig. 1 shows a partial top plan, partial transverse sectional view taken along line 1—1 of Fig. 2; and Fig. 2 is a side elevational view of my present invention as applied to a depending brake lever and the releasing means thereof.

Referring now more in detail to the aforesaid illustrative embodiment of the present invention and with more reference to the drawing, numeral 5 generally designates an extension lever which consists of the side walls 6 and top wall 7 formed to present a tubular portion 8 receptive of a knob 9 or any other gripping device. The lever is open at the bottom thereof and has its top wall 7 provided with the cut-away portion 10 so as to present the arms or lugs 7a and 7b.

The outer extremities of the arms, 7a and 7b, are pivoted, as at 11, to an open strap 12, which is secured about a depending brake lever 13 by means of the bolt and nut 14, the movement of the brake lever 13 being controlled by the releasing lever 15.

Pivotally mounted in the side walls 6 of the lever 5, intermediate in arms 7a and 7b, as at 16, is a tripping hammer 17. The member 17 is more or less in the shape of a shallow U and includes a shank or yoke portion provided, at a point remote from the center thereof, with bosses 19 receptive of the pivots 16.

One end of the yoke is curved, as at 20, and has at the outer end thereof, a transverse bearing portion 21. The other end of the yoke 18 is curved, as at 22, and has, at the outer end thereof, a transverse bearing portion 23.

The upper bearing portion 21 is adapted to contact the releasing means 15 and the lower bearing portion 23 is adapted to abut the depending lever 13.

This completes the description of the aforesaid illustrative embodiment of the present invention, and its mode of use may be briefly summarized as follows:

While I have shown the device as applied to a depending brake lever, it obviously can be utilized with other types of brakes. The device is applied to the brake by securing the strap 12 about the brake lever at a point which will permit the upper bearing portion 21 to engage the releasing means 15 near the outer end thereof. When the strap 12 has been fastened in place by means of the bolt and nut 14 the bearing portions will rest against the brake lever and the releasing means thereof as shown in full lines in Fig. 2 of the drawing.

By depressing the lever 5 to the position shown in broken lines in Fig. 2 the distance between parallel lines intersecting the pivot points 11 and 16 is shortened so that the bearing portions 21 and 23 slide downwardly along the brake lever and the releasing means thereof and the tripping hammer 17 is simultaneously pivoted so that the upper bearing portion 21 urges the releasing means 15 toward the lever 13 thus permitting the brake to be operated.

Upon releasing the knob 9, the spring controlling the releasing means 15 causes all parts to resume their normal positions shown in full lines in Fig. 2 of the drawing.

This completes the description of the mode of operation and use of the aforesaid illustrative embodiment of the present invention. It will be noted that the device is simple in construction, it is easy and economical to fabricate, assemble and use and is admirably adapted to perform the intended functions.

Other objects and advantages of the device of the present invention will readily occur to those skilled in the art to which the present invention relates.

What I claim as my invention is:

1. An extension device for use in connection with a brake lever and the releasing means thereof comprising an operating lever adapted to be pivotally associated with the brake lever and a tripping member pivotally connected with said operating lever and provided with bearing portions adapted to abut against the brake lever and the releasing means thereof whereby movement of said operating lever slides said tripping member relative to the brake lever and the releasing means thereof and simultaneously moves the latter toward the former.

2. An extension device for use in connection with a brake lever and the releasing means thereof comprising a strap adapted to be removably affixed to the brake lever, an operating lever pivotally fastened to said strap, and a tripping member pivotally connected with said operating lever and provided with bearing portions adapted to abut against the brake lever and the releasing means thereof whereby movement of said operating lever slides said tripping member relative to the brake lever and the releasing means thereof and simultaneously moves the latter toward the former.

3. An extension device for use in connection with a brake lever and the releasing means thereof comprising an operating lever adapted to be pivotally associated with the brake lever and a tripping member pivotally connected at a point remote from the center thereof with said operating lever and provided with bearing portions adapted to abut against the brake lever and the releasing means thereof whereby movement of said operating lever slides said tripping member relative to the brake lever and the releasing means thereof and simultaneously moves the latter toward the former.

4. An extension device for use in connection with a brake lever and the releasing means thereof comprising an operating lever adapted to be pivotally associated with the brake lever, and a shallow U-shaped bar pivotally connected with said operating lever and provided, at the ends of the arms thereof, with bearing portions adapted to abut against the brake lever and the releasing means thereof whereby movement of said operating lever slides said U-shaped bar relative to the brake lever and the releasing means thereof and simultaneously moves the latter toward the former.

5. An extension device for use in connection with a brake lever and the releasing means thereof comprising an operating lever adapted to be pivotally associated with the brake lever and a shallow U-shaped bar pivotally connected at a point remote from the center thereof with said operating lever and provided at the ends of the arms thereof with bearing portions adapted to abut against the brake lever and the releasing means thereof whereby movement of said operating lever slides said U-shaped bar relative to the brake lever and the releasing means thereof and simultaneously moves the latter toward the former.

6. An extension device for use in connection with a brake lever and the releasing means thereof comprising an operating lever adapted to be pivotally associated with the brake lever, and a tripping member pivotally connected with said operating lever and provided with transverse bearing bosses adapted to abut against the brake lever and the releasing means thereof whereby movement of said operating lever slides said tripping member relative to the brake lever and the releasing means thereof and simultaneously moves the latter toward the former.

7. An extension device for use in connection with a brake lever and the releasing means thereof comprising an operating lever adapted to be pivotally associated with the brake lever and a tripping member pivotally connected at a point remote from the center thereof with the said operating lever and provided with transverse bearing bosses adapted to abut against the brake lever and the releasing means thereof whereby movement of said operating lever slides said tripping member relative to the brake lever and the releasing means thereof and simultaneously moves the latter toward the former.

8. An extension device for use in connection with a brake lever and the releasing means thereof comprising an operating lever adapted to be pivotally associated with the brake lever, and a shallow U-shaped bar connected with said operating lever and provided, at the ends of the arms thereof with transverse bearing bosses adapted to abut against the brake lever and the releasing means thereof whereby movement of said operating lever slides said U-shaped bar relative to the brake lever and the releasing means thereof and simultaneously moves the latter toward the former.

9. An extension device for use in connection with a brake lever and the releasing means thereof comprising an operating lever adapted to be pivotally associated with the brake lever, and a shallow U-shaped bar pivotally connected at a point remote from the center thereof with said operating lever and provided at the ends of the arms thereof with transverse bearing bosses adapted to abut against the brake lever and the releasing means thereof whereby movement of said operating lever slides said U-shaped bar relative to the brake lever and the releasing means thereof and simultaneously moves the latter toward the former.

10. An extension device for use in connection with a brake lever and the releasing means thereof comprising an operating lever and a tripping member pivoted thereto and provided with bearing surfaces adapted to abut the brake lever and the releasing means thereof at two points.

JOSEPH FISCHER.